United States Patent [19]
Sloan et al.

[11] 3,747,787
[45] July 24, 1973

[54] CART FOR TRANSPORTING MONUMENTS OR THE LIKE

[76] Inventors: Raymond L. Sloan, 2040 N. Cedar;
Harold L. Sloan, 505 N. Wilson,
both of Jefferson, Iowa 50129

[22] Filed: Mar. 6, 1972

[21] Appl. No.: 231,992

[52] U.S. Cl. ................. 214/390, 214/373, 214/396
[51] Int. Cl. ............................................. B60p 3/00
[58] Field of Search ..................... 214/390, 396, 373

[56] References Cited
UNITED STATES PATENTS

| | | | |
|---|---|---|---|
| 2,638,236 | 5/1953 | Prowinsky et al. | 214/373 |
| 2,870,928 | 1/1959 | Haggard et al. | 214/373 |

*Primary Examiner*—Albert J. Makay
*Attorney*—Zarley, McKee & Thomte

[57] ABSTRACT

A cart for transporting monuments or the like is disclosed and comprises a horizontally disposed, U-shaped wheeled frame means having an open rearward end. A U-shaped lifting lever assembly is pivotally secured to the frame means adjacent the rearward end thereof for lifting one end of the monument. A second lifting lever assembly is pivotally mounted on the frame means adjacent the forward end thereof for lifting the other end of the monument. A monument stabilizer is provided on the frame means which engages the monument so as to prevent the monument from tipping during the transporting thereof.

10 Claims, 8 Drawing Figures

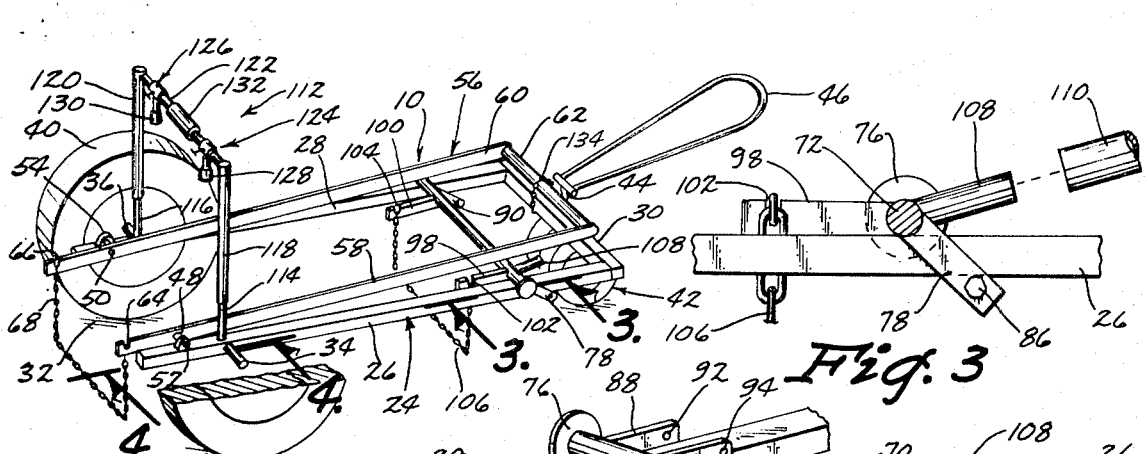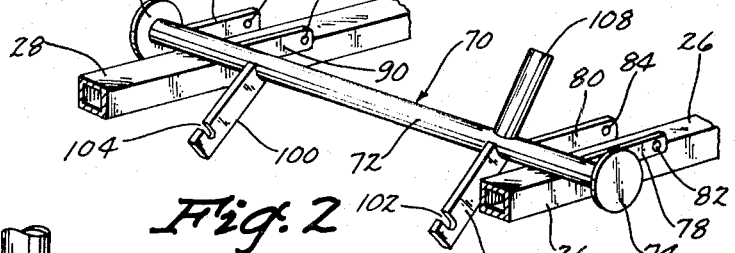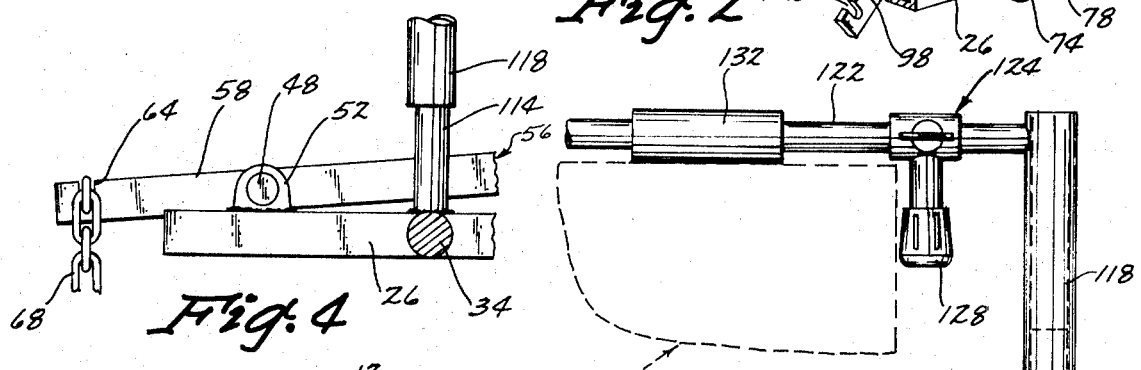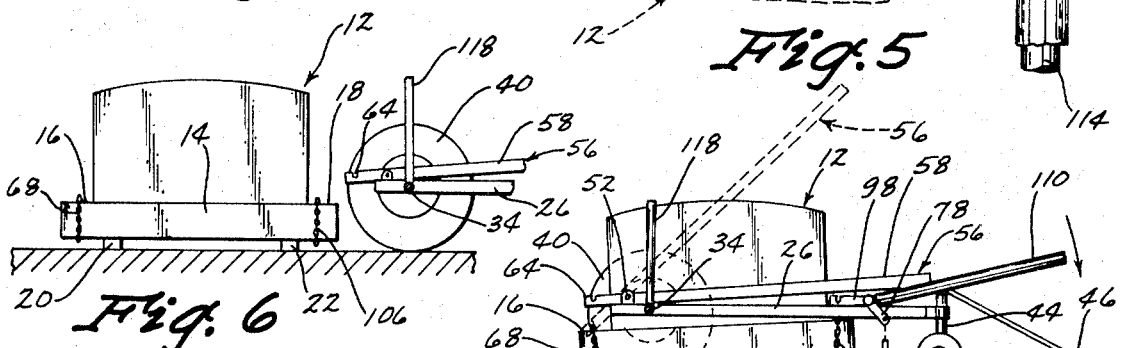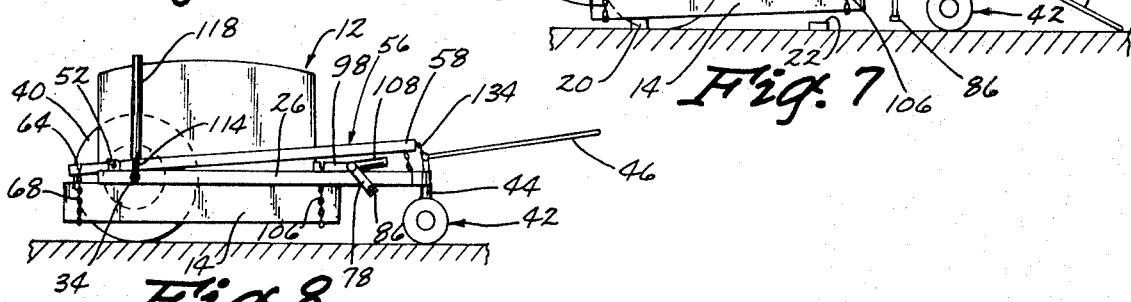

CART FOR TRANSPORTING MONUMENTS OR THE LIKE

Monuments are extremely heavy and are very difficult to conveniently move. It is frequently necessary to move the monuments within the plant, display room, etc. and the movement thereof has plagued the industry for some time.

Therefore, it is a principal object of this invention to provide a means for transporting monuments or the like.

A further object of this invention is to provide a cart for transporting monuments or the like having lifting lever assemblies provided thereon for lifting the opposite ends of the monument from the supporting surface.

A further object of this invention is to provide a cart for transporting monuments or the like having a stabilizer thereon to prevent the monument from tipping during the transporting thereof.

A further object of this invention is to provide a cart for transporting monuments or the like which is maneuverable.

A further object of this invention is to provide a cart for transporting monuments or the like which is convenient to use, durable in use and economical of manufacture.

These and other objects will be apparent to those skilled in the art.

This invention consists in the construction, arrangements and combination of the various parts of the device, whereby the objects contemplated are attained as hereinafter more fully set forth, specifically pointed out in the claims, and illustrated in the accompanying drawings, in which:

FIG. 1 is a rear perspective view of the cart of this invention with portions thereof cut away to more fully illustrate the invention:

FIG. 2 is a partial perspective view of the front lifting lever assembly:

FIG. 3 is an enlarged sectional view seen along lines 3—3 of FIG. 1:

FIG. 4 is an enlarged sectional view seen along lines 4—4 of FIG. 1;

FIG. 5 is a rear elevational view of a portion of the stabilizer assembly:

FIG. 6 is a side view illustrating the cart being positioned with respect to the monument:

FIG. 7 is a view similar to FIG. 6 illustrating a further step in attaching the cart to the monument; and FIG. 8 is a view similar to FIGS. 6 and 7 which illustrates the monument being supported by the cart.

The cart of this invention is referred to generally by the reference numeral 10 while the reference numeral 12 refers to a monument having a rectangular base 14. For purposes of description, the base 14 will be described as having ends 16 and 18. Ordinarily, the base 14 is supported by blocks 20 and 22.

Cart 10 comprises a horizontally disposed frame means 24 including side frames 26 and 28, front frame 30 and an open rearward end portion 32. Axle stubs 34 and 36 are secured to and extend outwardly from frames 26 and 28 respectively and have wheels 38 and 40 rotatably mounted thereon respectively. Caster wheel assembly 42 is pivotally secured to front frame 30 by means of the vertically disposed shaft 44 which is rotatably mounted thereon. A substantially U-shaped handle 46 is operatively connected to the upper end of shaft 44 to permit the selective turning of the caster wheel assembly 42 so that the cart can be maneuvered.

Shafts 48 and 50 are rotatably mounted in supports 52 and 54 respectively which are secured to side frames 26 and 28 respectively forwardly of the rearward end thereof. The numeral 56 designates a substantially U-shaped lifting lever including side frames 58 and 60 and front frame 62. Side frames 58 and 60 are secured to the shafts 48 and 50 respectively so that lifting lever 56 may be pivotally moved with respect to frame means 24. The rearward ends of side frames 58 and 60 are normally positioned (FIG. 1) rearwardly of the rearward ends of side frames 26 and 28 and have notches 64 and 66 formed therein extending downwardly thereinto as illustrated in FIG. 1. The numeral 68 refers to a chain member, the links of which are adapted to be received by the notches 64 and 66 to maintain the chain member in various sling positions as will be explained hereinafter.

In FIG. 2, a front lifting lever assembly is referred to by the reference numeral 70. Lifting lever 70 is selectively movably mounted on the frames 26 and 30 and is pivotal with respect thereto. Assembly 70 includes a shaft 72 which rests on and extends between side frames 26 and 30. Discs 74 and 76 are provided on the opposite ends of shaft 72 to prevent the shaft 72 from slipping from either of the side frames 26 and 28. Spaced apart arms 78 and 80 are secured to shaft 72 adjacent one end thereof and extend transversely therefrom. Openings 82 and 84 are provided at the ends of the arms 78 and 80 respectively which are adapted to receive the bolt 86 extending therethrough.

Spaced apart arms 88 and 90 are secured to shaft 72 adjacent the other end thereof and extend transversely therefrom. Openings 92 and 94 are provided at the ends of the arms 88 and 90 respectively and are adapted to receive a bolt 96 extending therethrough (not shown).

Spaced apart arms 98 and 100 are secured to shaft 72 between side frames 26 and 28 and extend rearwardly therefrom. Notches 102 and 104 are provided in the upper rearward ends of arms 98 and 100. The numeral 106 refers to a chain member, the links of which are adapted to be received by the notches 102 and 104 to maintain the chain member in various sling positions as will be explained hereinafter.

Shaft stub 108 is secured to shaft 72 as seen in FIG. 2 and extends upwardly and forwardly therefrom. A pipe 110 is provided and is adapted to slip over shaft stub 108 as seen in FIG. 3. The cart 10 is also provided with a monument stabilizer assembly 112 for stabilizing the monument when the monument is being transported. Assembly 112 comprises a pair of posts 114 and 116 secured to and extending upwardly from side frames 26 and 28 respectively. Pipes 118 and 120 are slidably mounted on posts 114 and 116 respectively and have a pipe member 122 extending between the upper ends thereof. A pair of thumbscrew adjustable supports 124 and 126 are mounted on pipe member 122 and have rubber tips 128 and 130 thereon respectively for engaging the opposite sides of the monument as partially illustrated in FIG. 5. A resilient sleeve 132 embraces pipe member 122 between supports 124 and 126 and is adapted to engage the upper end of the monument as illustrated in FIG. 5.

The cart is used as follows. Assuming that the monument 12 is supported by the blocks 20 and 22, the chains 68 and 106 are placed around the opposite ends of the monument as illustrated in FIG. 6. The cart is then maneuvered so that the monument is received by the open rearward end 32 of the frame means. The cart is moved with respect to the monument until the rearward end of the lifting lever 56 is disposed above the chain member 68. The bolts 86 and 96 are removed from the arms 78, 80 and 90, 88, respectively so that the shaft 72 may be pivotally moved to permit the arms 98 and 100 to be lowered. The shaft 72 may be slidably moved on the side frames 26 and 28 to compensate for various monument sizes and would be moved on the side frames 26 and 28 until the rearward ends of the arms 98 and 100 were positioned adjacent the chain member 106. The opposite ends of the chain member 106 are then placed in the notches 102 and 104. The pipe 110 is then slipped over the shaft stub 108 to aid in pivotally moving the arms 98 and 100 upwardly to cause the end of the monument 12 to be raised to the position illustrated in FIG. 7. When the end of the monument has been raised to the position illustrated in FIG. 7, the openings 82 and 84 in arms 78 and 80 and the openings 92 and 94 in the arms 88 and 90 respectively will be positioned below the side frames 26 and 28 respectively. The bolts 86 and 96 are then inserted through the openings to maintain the end of the monument in the position illustrated in FIG. 5.

The lifting lever 56 is then pivotally moved from the position illustrated in FIG. 1 to the position illustrated by broken lines in FIG. 7. The opposite ends of the chain member 68 are then secured or mounted in the notches 64 and 66 in the rearward ends of the side frames 58 and 60 respectively. The lifting lever 56 is then pivotally moved from the position illustrated by broken lines in FIG. 7 to the position illustrated by solid lines in FIG. 8 which causes the upper end of the monument to be raised from the block 20. A chain 134 is then extended around the frames 30 and 62 to maintain the lifting lever in the position illustrated in FIG. 8.

It should be noted that the stabilizer assembly 112 would ordinarily be positioned with respect to the monument prior to the monument being lifted from the supporting blocks 20 and 22. The adjustable supports 124 and 126 would be slidably moved on the pipe member 122 so as to engage the opposite sides of the monument as partially illustrated in FIG. 5. The pipe member 122 would be positioned with respect to the monument so that the resilient sleeve 132 engages the upper end of the monument. When the monument is lifted by the lifting levers, the pipes 118 and 120 slidably move upwardly on the posts 114 and 116 respctively. When the monument is being transported, the stabilizer assembly prevents the monument from tipping.

Thus it can be seen that a convenient cart has been provided for transporting heavy and cumbersome monuments or the like. The cart is easily maneuvered due to the caster wheel assembly 42 and the handle 46. The monument 12 is simply pulled to the desired location and properly positioned. The chain 134 is then loosened so that the lifting lever 56 can be pivotally moved from the position illustrated in FIG. 8 to the position illustrated by broken lines in FIG. 7 thereby causing the end of the monument to be lowered onto suitable supporting blocks or the like. The pipe 110 would then be placed on the shaft stub 108 and pressure applied thereto to permit the bolts 86 and 96 to be removed. The pipe 110 is then permitted to pivotally move upwardly so that the other end of the monument may be lowered onto suitable supporting blocks or the like. The chains 68 and 106 are then disconnected from the lifting lever assemblies and the cart can be pulled outwardly away from the monument.

Thus it can be seen that an extremely convenient cart has been provided which accomplishes at least all of its stated objectives.

We claim:

1. A cart for transporting monuments having a rectangular base and an upstanding portion, said base having opposite ends, comprising,
    a substantially horizontally disposed U-shaped first frame means having first and second side frame members, a forward end portion and an open rearward end portion,
    wheel means supporting said first frame means,
    a substantially U-shaped second frame means having first and second side frame members, a forward end portion and an open rearward end portion,
    said first and second side frame members of said second frame means being pivotally connected adjacent their rearward ends to said first and second side frame members of said first frame means adjacent the rearward ends thereof respectively whereby said forward end portion of said second frame means may be selectively raised and lowered with respect to said first frame means to raise and lower the rearward ends of said first and second side frame members of said second frame means,
    a first sling means connected to and extending between the rearward ends of said first and second side frames of said second frame means for supporting one end of said monument,
    a lifting lever means operatively supported on said first and second side frame members of said first frame means and being selectively movable between raised and lowered positions,
    and a second sling means connected to said lifting lever means for supporting the other end of said monument.

2. The cart of claim 1 wherein said lifting lever means is longitudinally movably mounted on said side frame members of said first frame means.

3. The cart of claim 2 wherein said lifting lever means comprises a shaft rotatably mounted on and extending between said side frame members of said first frame means, first and second spaced apart arms secured to said shaft between said side frame members of said first frame means and extending rearwardly therefrom, said first and second arms being adapted to have said second sling means secured thereto, means secured to said shaft for rotating said shaft, and means for selectively maintaining said shaft in at least one position of its rotational movement.

4. The cart of claim 3 wherein said first and second arms have notches formed in their rearward ends for receiving the opposite ends of said second sling means.

5. The cart of claim 1 wherein the rearward ends of said first and second side frame members of said second frame means are positioned rearwardly of the rearward ends of said first and second side frame members of said first frame means when the rearward ends of said first and second side frame members of said second frame means are in their raised position.

6. The cart of claim 5 wherein the rearward ends of said first and second side frame members of said second frame means have notches formed there-in for receiving the opposite ends of said first sling means.

7. The cart of claim 1 wherein first and second wheels are rotatably secured to said first and second side frame members of said first frame means adjacent the rearward ends thereof, and a caster wheel assembly secured to the forward end portion of said first frame means.

8. The cart of claim 7 wherein a steering handle means is secured to said caster wheel assembly.

9. The cart of claim 1 wherein a monument stabilizer assembly is mounted on said first frame means for stabilizing the monument during the lifting and transporting thereof.

10. The cart of claim 9 wherein said stabilizer assembly comprises first and second posts secured to said first and second side frame members of said first frame means respectively and extending upwardly therefrom, first and second pipes vertically movably mounted on said first and second posts respectively, an elongated support secured to and extending between said first and second pipes, and means on said pipe member for engaging the monument to prevent the monument from tipping.

* * * * *